G. W. CHAPMAN, Jr.
Harvester Cutter.

No. 80,598.

Patented Aug. 4, 1868.

Witnesses.
Theo. Tusche
W. Trevin

Inventor.
G. W. Chapman Jr.
Per Munn & Co.
Attys.

United States Patent Office.

G. W. CHAPMAN, JR., OF IOWA FALLS, IOWA, ASSIGNOR TO HIMSELF AND W. A. PLANTZ, OF SAME PLACE.

Letters Patent No. 80,598, dated August 4, 1868.

IMPROVEMENT IN HARVESTER-CUTTERS.

The Schedule referred to in these Letters Patent and making part of the same.

TO ALL WHOM IT MAY CONCERN:

Be it known that I, G. W. CHAPMAN, Jr., of Iowa Falls, in the county of Hardin, and State of Iowa, have invented a new and useful Improvement in Sickle-Bars for Mowing-Machines; and I do hereby declare that the following is a full, clear, and exact description thereof, which will enable those skilled in the art to make and use the same, reference being had to the accompanying drawings, forming part of this specification, in which—

Figure 1:
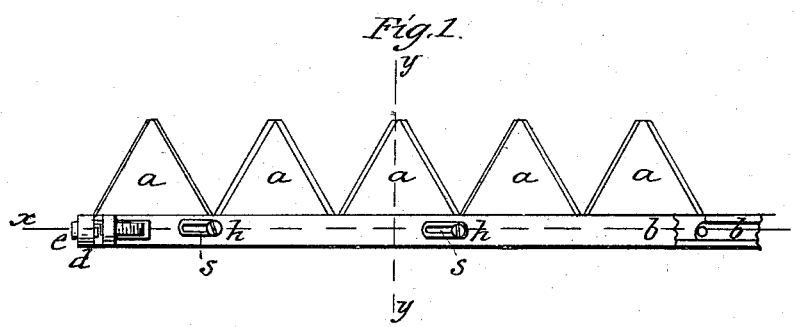
Figure 2:
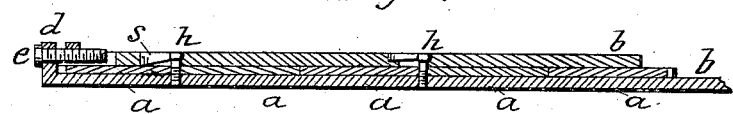
Figure 3:
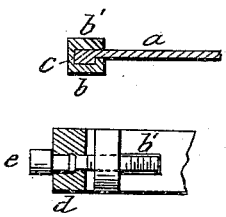

Figure 1 is a top view of my improved sickle-bar.
Figure 2 is a vertical longitudinal section, taken in the line $x\,x$, fig. 1.
Figure 3 is a cross-section through $y\,y$, fig. 1.
Similar letters of reference indicate corresponding parts.

This invention relates to an improvement in the construction of sickle-bars for mowers and reapers, and consists in forming the bar in two pieces, in such manner as to secure separate cutters or teeth between them, so that the teeth may be easily removed when necessary to sharpen and repair them, or replace any when broken, as hereinafter described.

The teeth, $a\,a$, are made separately, with cutting-points and sides formed in the usual manner, but having ther backs made with a rib or shoulder, $e$, as shown in fig. 3, which fits in a recess formed between two bars, $b\,b'$, to hold the teeth in place firmly.

On one end of the lower bar $b$ is an upset or shoulder, $d$, through which shoulder a screw, $e$, held by the head, passes into the end of the upper bar $b'$ to draw it up, and thus tighten the bars upon the teeth.

This is accomplished by means of screws $h\,h$, which pass through slots $s\,s$, in the upper bar $b'$, at points between the separate teeth, alternately, in pairs or otherwise, and screwed into the lower bar $b$.

The head of the screws is made broad and flat-shouldered on the under side, to lap over and lie upon the side of the slot through which the shank passes, or fits in a recess wider than the slot, which recess has an inclined bottom, as seen in fig. 2, whereby the two bars $b\,b'$ are drawn together tightly upon the back of the teeth by the pressure of the heads of the screws $h\,h$, when the upper bar $b'$ is moved by the end screw $e$, which operation and effect will be readily perceived.

Having described my invention, I claim as new, and desire to secure by Letters Patent—

The sickle-bar, constructed as described, consisting of the upper bar $b'$, provided with the inclined slots $s$, for the passage of the screws $h$, the lower bar $b$ having a groove for the reception of the ribs $c$ of the teeth $a$, said bars being adjusted to clamp the teeth by means of the screw $e$ in their upset ends, as herein described for the purpose specified.

G. W. CHAPMAN, JR.

Witnesses:
O. W. GARRISON,
P. MARTIN.